United States Patent Office 3,488,744
Patented Jan. 6, 1970

3,488,744
PROCESS FOR PREPARING HIGH RUBBER-CONTENT GRAFT POLYBLENDS
Speros P. Nemphos, Springfield, Mass., and Richard E. Delacretaz, Cincinnati, Ohio, assignors to Monsanto Company, St. Louis, Mo., a corporation of Delaware
No Drawing. Filed Aug. 11, 1966, Ser. No. 571,713
Int. Cl. C08f *19/02, 19/06*
U.S. Cl. 260—880    15 Claims

ABSTRACT OF THE DISCLOSURE

A rubbery polymer is dissolved in a vinylidene monomer-containing polymerizable formulation which contains at least one non-solvent for the rubbery polymer so as to create a two-phase system. The resulting mixture is subjected to polymerization en masse to produce inversion of the phases and form a partially polymerized mixture which is suspended in an inert liquid and further polymerized therein. A portion of the polymerizable formulation is distilled and extracted from the suspension, and polymerization is continued to substantial completion. The final product contains up to 35% by weight of rubbery polymer.

---

The present invention relates to novel polymeric compositions, and, more particularly, to polyblends containing relatively high concentrations of rubber and to a novel process for producing such polyblends.

As is well known, polymeric compositions containing rubber particles dispersed therein often provide certain advantages in physical properties. Generally, it is desirable that the rubber particles be graft copolymers wherein a polymeric chain is grafted onto a preformed rubber substrate so as to modify the nature and properties thereof, and particularly to improve adhesion or compatibility of the rubber particles in certain matrices.

Polyblends using styrene-type polymers for the matrix and graft superstrate have become increasingly important during the last fifteen years or so, and at present, occupy a position of great significance in the plastics industry. Exemplary of such polyblends are impact styrenes which are grafts of styrene onto a rubber substrate and dispersed in a styrene matrix and ABS materials which are grafts of a styrene-acrylonitrile-type copolymer on a butadiene-type rubber which is dispersed in a matrix of a styrene-acrylonitrile-type copolymer. Although it is possible to produce these polyblends by first forming the graft copolymer and then physically admixing the preformed graft copolymer with the polymeric matrix, commercially advantageous operation has been achieved by providing a sufficiently high ratio of monomers to rubber so as to form contemporaneously both the rubber graft and matrix polymer so that the recovered product of polymerization approaches if not meets the desired formula.

Various polymerization techniques have been proposed for preparing the graft copolymers such as mass polymerization, emulsion polymerization and suspension polymerization. In a highly advantageous process, the rubbery polymer is dissolved in a polymerizable formulation containing a non-solvent for the rubber so as to produce a rubber-monomer phase and a polymer-monomer phase and polymerization is effected en masse past the point where inversion of the phases occurs with the polymer in polymerizable formulation being the continuous phase and the rubber in polymerizable formulation being the discontinuous phase. After polymerization is continued to some predetermined level such as conversion of about 20.0 to 50.0 percent of the monomers in the polymerizable formulation, the partially polymerized syrup is dispersed or suspended in an inert liquid such as water, and polymerization is continued to the desired end point of conversion of the monomers.

A serious limitation upon a method such as that described above is imposed by the formation of a highly viscous mass in the mass polymerization step when the monomers form the solvent for the rubber since the production of the graft copolymer and matrix polymer results in depletion of the volume of monomers and thereby the solvent. In such a mass polymerization mixture, high viscosities are, of course, undesirable in that they make stirring to effect heat transfer and handling very difficult or impossible and often impose commercially prohibitive heat transfer and power requirements in the process. Accordingly, it can be seen that there is a practical upper limit to the rubber to monomer ratio in a mass polymerization process if unwieldy and unsatisfactory reaction mixtures are to be avoided and an inert solvent is not to be employed.

If an inert solvent is added to alleviate the viscosity problem, then this solvent must be removed after the polymerization reaction. To avoid the use of inert solvents in such mass-suspension polymerization reactions and the resultant need for removing such solvents after polymerization has been terminated, it has been necessary to limit the rubber content or to terminate polymerization before all of the monomers have reacted and to remove the monomers so as to increase the percentage of rubber in the final product. If either inert solvents or unreacted monomers are to be removed after polymerization has taken place, the cost of the process increases since the operating cycle is lengthened and stripping from the polymerized mixture may be difficult.

Accordingly, it is an object of this invention to provide a novel mass-suspension polymerization process for the preparation of polyblends having relatively high concentrations of rubber.

It is also an object to provide such a polymerization process for the preparation of polyblends wherein a high degree of control of the rubber graft particle size is possible.

A further object is to provide such a polymerization process for the production of polyblends wherein heat transfer and power requirements are satisfactory and the need for stripping after polymerization is minimized.

An additional object is to provide novel polyblends having relatively high concentrations of rubber using such a process.

A specific object is to provide a novel process for producing polyblends of the type utilizing styrene-type polymers for the graft superstrate and for the matrix in which the graft copolymer is dispersed.

Other objects and advantages will be readily apparent from the following detailed specification and claims.

It has now been found that the foregoing and related objects can be readily attained in a process wherein a rubbery polymer is dissolved in a polymerizable formulation containing a vinylidene monomer and at least one solvent for the rubbery polymer so as to form a polymerization mixture which is subjected to polymerization en masse to polymerize a portion of the monomer in the polymerizable formulation, generally about 15.0 to 50.0 percent, and preferably about 25.0 to 40.0 percent. Polymerization en masse is continued past the point of phase inversion to form a partially polymerized mixture wherein the continuous phase is a solution of polymerized monomer in unpolymerized monomer and the discontinuous phase is a solution of rubbery polymer in the unpolymerized monomer, the rubbery polymer at this stage generally having been grafted to at least some extent. The partially polymerized mixture is then suspended in an inert liquid such as water, and this suspension is then subjected to polymerization conditions. During the polymerization of the suspension, there is distilled and extracted therefrom a portion of the polymerizable formulation, and polymerization of the suspension is continued to substantial completion of the polymerization reaction.

By such a process, it is possible to provide a polymerizable formulation which will not only initially dissolve the rubbery polymer but also maintain the viscosity of the polymerizing mixture during mass polymerization at a level where power and heat transfer requirements are not prohibitive and wherein optimum reaction can be obtained. By removal of a viscosity-lowering inert diluent or of a portion of the monomers when excess monomer is added to control viscosity, or both, the ultimate rubber content of the composition obtained from the polymerization process may be increased to a highly desirable level. The polymerization reaction is continued to substantial completion and the need for a subsequent stripping operation of unreacted monomers or solvent is avoided.

The polymerizable formulation contains a solvent for the rubbery polymer, and this solvent may be one or more monomers. However, it is possible to include in the polymerizable formulation one or more inert organic diluents, which may be polar or non-polar depending upon the desired characteristics. For most desirable operation, a monomer or diluent which is a non-solvent for the rubber is included to achieve phase inversion and optimum control over particle size as will be discussed hereinafter. The term "polymerizable formulation" as used herein is intended to encompass a formulation containing one or more monomers having such solvent properties and essentially free from inert organic diluents, as well as mixtures of monomers, which may be solvents for the rubbery polymer, and inert organic solvents or diluents which are miscible with the polymerizable formulation and dissolve the polymer produced therefrom.

In conducting the process of the present invention, it will be seen that the portion removed by extraction and distillation will depend upon the nature of the polymerizable monomer formulation. If the polymerizable monomer formulation is comprised substantially completely of reactive materials, i.e., is free from any appreciable amount of inert organic diluents, then the portion extracted will be a portion of the unpolymerized monomers. If an inert organic diluent is included within the formulation, then the portion extracted may be principally or substantially entirely comprised of the inert organic diluent.. Ideally, the process is conducted so as to complete the reaction with a minimum amount of volatile or unreacted components which need to be removed from the polymerized mixture.

POLYMERIZABLE FORMULATION

The polymerizable formulation will, of course, contain the monomers to be polymerized, catalyst where required, and other desirable components such as stabilizers, molecular weight regulators, etc. In addition, it may contain an inert organic diluent which is miscible with the monomers and which acts as a solvent for the polymerized monomer.

The specific monomers will, of course, vary with the desired product. However, the process is highly advantageously employed in the manufacture of styrene-type polyblends, i.e., polymerizable monomer formulations containing monovinylidene aromatic hydrocarbons either alone or in combination with other copolymerizable monomers such as unsaturated nitriles. Where a styrene-type monomer is employed solely, then the resultant product will be of the type known as an "impact styrene". Where styrene and acrylonitrile-type monomers are employed jointly in the polymerizable formulation, the resulting product will be of the type known as "ABS."

However, it should be understood that the composition of the polymerizable formulation may vary widely.

Exemplary of the monovinylidene aromatic monomers that may be homopolymerized or interpolymerized are styrene; alpha-alkyl monovinylidene monoaromatic compounds, e.g., alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc.; vinyl naphthalene; vinyl anthracene, etc. The alkyl substituents generally have on to four carbon atoms and may include isopropyl and isobutyl groups. If so desired, mixtures of such monovinylidene aromatic monomers may be employed.

Exemplary of other vinylidene monomers that can be employed or interpolymerized with monovinylidene aromatic monomers are unsaturated nitriles, such as acrylonitrile, methacrylonitrile, ethacrylonitrile and mixtures thereof; conjugated 1,3-dienes, e.g. butadiene, isoprene, etc.; alpha- or beta- unsaturated monobasic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in an interpolymer will vary.

The preferred polymerizable monomer formulations contain at least 10.0 percent by weight of monovinylidene aromatic monomer and preferably at least 50.0 percent by weight thereof. Desirably, they contain an unsaturated nitrile which should be present in the amount of at least 5.0 percent by weight thereof, and preferably at least 10.0 percent. From the standpoint of highly advantageous ABS-type products, the monomer formulations contain 20.0 to 95.0 percent, and preferably they should contain 60.0 to 85.0 percent, by weight of the monovinylidene aromatic hydrocarbon such as styrene, and 80.0 to 5.0 percent, and preferably 40.0 to 15.0 percent, by weight of the unsaturated nitrile such as acrylonitrile.

When so desired, inert organic diluents may be added as a part of the polymerizable monomer formulation, generally for the purposes of reducing the viscosity of the formulation during polymerization or for providing a polar component to assist in separation of the polymerizing composition into two phases. The nature and amount, if any, of the inert organic diluent will vary with the rubbery polymer, the polymerizable monomers and the conditions of operation. For example, when using polyisoprene, the use of even small amounts of polar diluents will bring about phase inversion at any early stage in polymerization due to its lower solubility. However, with other rubbers and various monomers, the amount of inert diluent may range as high as 30.0 percent and, of course, may be as little as 0.5 percent, based upon the weight of the monomers.

It is important that the inert organic diluent which is selected exhibit a relatively low water solubility, i.e. less than 20.0 percent, and preferably less than 10.0 percent, so as to minimize any adverse effect upon the subsequent suspension of the partially polymerized mixture. However, even relatively soluble polar diluents can be employed in relatively small percentages in combination with other less soluble diluents to achieve the desired result. Exemplary of polar solvents which may be employed are organic ethers, esters, ketones and nitriles such as methyl ethyl ketone, methyl butyl ketone, tetrahydrofuran, acetonitrile, ethyl acetate and dioxane. Exemplary of the inert organic diluents which may be employed are alkanes, cycloalkanes and aromatic hydrocarbons such as the pentanes, the hexanes, the heptanes, the octanes, cyclohexane, cycloheptane, cyclooctane, benzene and the toluenes.

The boiling point of the organic diluent is desirably below that of the monomers in the polymerizable formulation for removal of the diluent preferentially during the extracting and distilling step. However, mixtures of diluent and monomers may be separated and the monomers recycled.

Any free radical generating catalyst may be used in the practice of this invention including actinic radiation. It is preferable to incorporate a suitable catalyst system for polymerizing the monomer such as the conventional monomer-soluble peroxy and perazo compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5 - dimethyl - 2,5 - di(tert-butylperoxy)hexane, 2,5-dimethyl-2,5-di(tert-butylperoxy)hexyne-3, tert-butyl hydroperoxide, cumene hydroperoxide, p-menthane hydroperoxide, cyclopentane hydroperoxide, di-isopropylbenzene hydroperoxide, p-tert-butylcumene hydroperoxide, pinane hydroperoxide, 2,5-dimethylhexane-2,5-dihydroperoxide, etc., and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001 to 1.0 percent by weight of the polymerizable material. In addition, it may be desirable to include relatively small amounts of antioxidants or stabilizers such as the conventional alkylated phenols, although these may be added during or after polymerization. In addition, the formulation may also contain other additives such as plasticizers, lubricants, colorants and non-reactive preformed polymeric materials which are suitable or dispersible therein.

THE RUBBER SUBSTRATE

Various rubbers onto which the polymerizable monomer formulation may be grafted during polymerization in the presence thereof are utilizable as the substrate of the graft copolymer including diene rubbers, natural rubbers, ethylene-propylene rubbers, ethylene-propylene terpolymer rubbers, acrylate rubbers, polyisoprene rubbers and mixtures thereof, as well as interpolymers thereof with each other or other copolymerizable monomers.

The effectiveness of a particular rubber as a substrate will vary with the nature of the polymerizable monomer formulation. Ethylene-propylene terpolymers providing pendant unsaturation have been used for grafting with vinyl halides and vinyl esters and so may be used desirably where such monomers are to be included within the interpolymers. Various other rubbers with varying effectiveness of grafting efficiency may be used with the several combinations of monomers through variations in the temperature and the amount of catalyst provided. The rubbers most advantageously employed are those produced by solution polymerization with anionic or Ziegler-type catalysts.

The preferred rubbers are diene rubbers or mixtures of diene rubbers, i.e., any rubbery polymers (a polymer having a second order transition temperature not higher than 0° centigrade, preferably not higher than —20° centigrade, as determined by ASTM Test D–746–52T) of one or more conjugated, 1,3-dienes, e.g., butadiene, isoprene, piperylene, chloroprene, etc. Such rubbers include homopolymers of conjugated 1,3-dienes with up to an equal amount by weight of one or more copolymerizable monoethylenically unsaturated monomers, such as monovinylidene aromatic hydrocarbons (e.g., styrene; an aralkylstyrene, such as the o-, m- and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropropenyl ketone, etc.); alpha-olefins (e.g. ethylene, propylene, etc.); pyridines; vinyl esters (e.g. vinyl acetate, vinyl stearate, etc.); vinyl and vinylidene halides (e.g., the vinyl and vinylidene chlorides and vinylidene chlorides and bromides, etc.); and the like.

Although the rubber may contain up to about 2.0 percent of a cross-linking agent, based on the weight of the rubber-forming monomer or monomers, cross-linking may present problems in dissolving the rubber in the monomers for the graft polymerization reaction. In addition, excessive cross-linking can result in loss of the rubbery characteristics.

However, cross-linking of the rubber graft is desirable to preserve proper morphology of the particles thus produced. Accordingly, some cross-linking during the grafting reaction is advantageous and inherent cross linking can be further encouraged through the variation of graft polymerization conditions as is well known in the art. Thus, rubber graft particles of spherical form and proper size may be obtained and maintained even during mechanical processing to achieve the desired dispersion thereof in the rigid matrix when such a technique is employed.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene), and unsaturated nitriles (e.g. acrylonitrile), or mixtures thereof. Particularly advantageous substrates are butadiene homopolymer or interpolymer of 90.0 to 95.0 percent by weight butadiene and 5.0 to 10.0 percent by weight of acrylonitrile or styrene.

THE POLYMERIZATION PROCESS

Although the amount of polymeric superstrate grafted onto the rubber substrate may vary from as little as 10.0 parts by weight to 100.0 parts of substrate to as much as 250.0 parts per 100.0 parts and even higher, the preferred graft copolymers will generally have a superstrate to substrate ratio of about 50 to 200:100 and most desirably about 70 to 150:100. With graft ratios above 50:100, a highly desirable degree of improvement in various properties generally is obtained.

The rubbery polymer or substrate is dissolved in the polymerizable formulation which will consist of monomers, catalysts, other optional components, and inert organic diluent where desired. Generally, this polymerization mixture is then polymerized en masse by heating at a temperature of about 75 to 125° centigrade over a period of about one to forty-eight hours and at a pressure of 1 to 100 pounds per square inch until a portion of the monomer has been polymerized, generally about 15.0 to 50.0 percent by weight thereof with conventional stirring to aid heat transfer during reaction. The time for this partial polymerization will vary depending upon the catalyst, pressures and temperatures employed and the particular monomers and ratios thereof. Generally, it is preferred to conduct such a prepolymerization process to convert approximately 20.0 to 35.0 percent by weight of the monomer.

The syrup provided by the partially polymerized formulation is then admixed with water in the presence of a suspending agent such as the acrylic acid-acrylate interpolymers of U.S. Patent No. 2,945,013, granted July 12, 1960, and U.S. Patent No. 3,051,682, granted Aug. 28, 1962. Secondary dispersing aids may also be added to obtain the desired suspension of the syrup in water. The suspending agent is desirably added to the water, although it may be added to the monomers ab initio or during initial polymerization. This suspension is subjected to agitation and heated at a temperature of about 75 to 200° centigrade for a period of one to forty-eight hours to obtain substantially complete polymerization of the monomers therein. Preferably, such further polymerization is carried out at a temperature of about 100 to 170° centigrade for a period of one to twenty hours, depending upon the catalyst and the amount thereof employed.

After the partially polymerized syrup has been suspended in water and the desired polymerization temperature has been attained, the pressure within the reaction vessel is adjusted so as to permit extraction and distillation of a volatile portion of the remaining polymerizable formulation. Although this may be done throughout the entire suspension polymerization reaction, it is desirably conducted prior to conversion of more than 75.0 percent of the monomer in the original polymerizable formulation so as to facilitate extraction and to control the ratios of comonomers in the remaining polymerizable formulation for optimum copolymer homogeneity. After completion of the reaction, the polymer beads are recovered by centrifuging, washed and dried.

The preferred process employs either a polar monomer or a polar inert organic diluent which will not dissolve the rubber so as to develop a two-phase system during mass polymerization. By such a process, the particle size of the graft copolymer can be effectively controlled and its diameter held within a desirable range of 0.5 to 3.0 microns. For example, a styrene-acrylonitrile composition will have the polar acrylonitrile component acting to facilitate separation of the rubber phase so that early separation into two phases and reduction in particle size can be attained during the mass polymerization step. Since diene rubbers are generally highly soluble in styrene, the desired phase separation and subsequent phase inversion can be achieved by the incorporation of a polar inert organic diluent as hereinbefore indicated. By controlling the amount of the polar diluent, the developement of the two phases is attained by adjusting the point of phase inversion and the total amount of polymerization conducted en masse.

The distillation and extraction of the portion of the polymerizable formulation is conveniently conducted through the medium of a reflux-type condenser which is often employed in reaction vessels. By venting the vapors from the kettle at the desired point during polymerization, the desired amount of the component may be extracted with relative ease since the formulation is not yet fully polymerized, and there are sufficient volatile components to enhance the distillation and extraction.

Since such suspension polymerization reactions are often conducted under pressure varying from 1 to 200 p.s.i., some reduction in pressure will generally occur during the distillation and extraction due to the reduction in the amount of vapors within the reaction vessel. If so desired, this may be compensated at least in part by simultaneous injection, at a point spaced from the vent, of an inert gas such as nitrogen. However, in most processes, the reduction in pressure, at the temperatures where distillation and extraction are conducted, for limited periods of time during the polymerization cycle will not unduly affect the polymerization reaction, particularly where monomers are being removed.

Obviously, the distillation and extraction most desirably occur simultaneously with continuing polymerization of the polymerizable formulation, although temporary interruptions, such as induced by reduction in pressure or temperature, may also be accommodated. The time at which the distillation and extraction occur may vary from shortly after suspension of the prepolymerized syrup to a time shortly before polymerization is completed. In fact, the distillation and extraction may be conducted during an extended period of time within the suspension polymerization portion of the cycle.

The amount of the portion extracted from the polymerization mixture will, of course, vary with the nature of the portion being extracted. Where an inert diluent is being employed, generally the process will be conducted so as to extract all of the inert diluent and thus achieve the desired benefits. Where no such diluent is employed but monomers are to be extracted, then the amount of the portion extracted will depend upon the desired rubber content in the final polymerization product. Generally, in either instance, the amount of the portion extracted will range from as little as 0.5 percent by weight of the polymerizable formulation to as much as 40.0 percent by weight, and possibly even higher where diluents are employed and their effect upon the suspension is not excessive.

GRAPH PARTICLE SIZE

As previously indicated, suspension polymerization affords many advantages in terms of ease of processing and polymerization when rubbery polymers are to be grafted. However, it is subject to the disadvantage that it generally affords little control over the particle size of the graft copolymer. For this reason, the formation of a partially polymerized syrup in a mass polymerization reaction affords many advantages since the particle size may be predetermined more easily during mass polymerization. This is particularly true when there is present in the polymerizable formulation a non-solvent for the rubber which tends to force the rubber out of solution and achieve a two-phase system.

For example, if styrene is homopolymerized in the presence of a diene rubber using a process in which polymerization is carried out en masse to about 30 to 35 percent conversion and the partially polymerized mixture is then suspended in water and polymerized to substantial completion, the average particle size will vary from about 5.0 to 15.0 microns. In a similar process wherein acrylonitrile is included to produce an ABS-type polymer, the average particle size may vary from about 0.5 to 5.0 microns. By incorporating an inert organic polar diluent in an impact styrene polymerizable formulation in such a process, the average particle size may be held within a desirable range of 0.5 to 3.0 microns.

Thus, it can be seen that the present process affords an opportunity for effecting considerable control over the particle size of the graft polymer through use of the highly effective mass-suspension polymerization technique while permitting the production of a polyblend having a relatively high content of rubber. Viscosity problems during mass polymerization can be substantially alleviated and overall process control can be readily maintained. Thus, the present technique permits the coupling of the economic and operating advantages of a suspension system and the particle size control advantages of the mass polymerization system to produce a high rubber content product of controlled graft particle size.

Exemplary of the efficacy of the present invention are the following examples wherein all parts are parts by weight unless otherwise indicated.

Example 1

To a reaction vessel are charged 225.0 parts styrene monomer, 81.0 parts acrylonitrile monomer, and 51.0 parts of butadiene rubber. In addition, di-tert-butyl peroxide and tert-butyl peracetate catalysts, a molecular weight regulator and stabilizers are added. After the reaction vessel is purged of oxygen by a stream of nitrogen, the reaction mixture is stirred and heated to polymerize approximately 30.0 percent of the monomers. The resulting syrup contains about 14.0 percent rubber. Its viscosity exceeds 5000 poises at 25° centigrade and at a shear rate of 1.0 second$^{-1}$.

A quantity of 285.0 parts of this partially polymerized syrup is then admixed with 313.0 parts of water having dissolved therein 1.7 parts of anhydrous sodium sulfate, 0.9 part of a condensate of a sodium salt of a naphthalene sulfonic acid sold under the trademark Darvan by R. T. Vanderbilt Company and 18.5 parts of a 5 percent aqueous solution of suspending agent comprising an interpolymer of 2-ethyl hexyl acrylate and acrylic acid. The suspension is agitated and heated to about 135° centigrade over a period of about two hours. Thereafter, the heat is increased, and an antifoaming agent is added. The vessel is then slowly vented, through a condenser, from a pressure of about 95 p.s.i.g. (too rapid venting will destroy the suspension); stripping of unreacted monomers commences when the pressure drops to about 85 p.s.i.g. and the temperature is about 140° centigrade. During the stripping period of about three hours, the temperature rises to about 154° centigrade and then falls to about 130° centigrade which decrease in temperature is generally undesirable. The pressure is lowered to about 23 p.s.i.g. About 49.0 parts of water and 27.5 parts of monomers are recovered during stripping. After polymerization has been terminated, less than 1.0 percent of unreacted monomers remains. Thereafter, the suspension is cooled, centrifuged, washed and dried to recover small spherical beads.

The polyblend produced contains about 16.0 percent rubber, and the graft particles have an average diameter of about 1.5 microns. The blend exhibits a Hunter gloss of about 54, an Izod impact value of 6.40 foot pounds per inch, and 24 percent orientation shrinkage.

Example 2

A partially polymerized syrup prepared essentially in the manner described above but containing 12.5 percent rubber is employed in this example. Agitation is used to aid in suspending 750 parts thereof in 900 parts of water containing 45.0 parts of a 5 percent aqueous solution of the acrylic acid-acrylate interpolymer suspending agent, 15.0 parts of a 20 percent aqueous solution of Darvan and 6.0 parts of anhydrous sodium sulfate. The mixture initially is heated to about 135° centigrade and then raised to about 150° centigrade. Then an antifoaming agent is added and stripping is commenced with the pressure being lowered ultimately to 35 p.s.i.g. After the desired quantity of monomers has been removed from the reaction mixture (in about 0.75 hour) polymerization is terminated. The product is thereafter treated as above.

The strippings recovered comprise about 48.0 percent acrylonitrile, 31.0 percent styrene and 1.5 percent molecular weight regulators. Water is also distilled off. The percentage of rubber in this polyblend is 13.3. Upon testing, it is found that the Izod impact value is 5.56 foot pounds per inch, the Hunter gloss is 20.9, and the percent shrinkage is 28.5.

Example 3

The charge to the suspension polymerization vessel is the same as that employed in Example 2. It is initially heated to and held at 140° centigrade. The temperature is then allowed to rise to 150° centigrade, at which point an antifoaming agent is introduced and stripping is commenced. After about one-half hour, additional antifoaming agent is added and concurrent stripping and polymerization are effected at a temperature maintained above 140° centigrade until the oil phase in the strippings is less than 1.0 percent by volume. In all, the mixture is subjected to stripping conditions for about one and one-half hours and the pressure ranges from about 65 to 35 p.s.i.g.

The rubber content of the polyblend produced thereby is about 16.2 percent. The polyblend exhibits an Izod impact value of 7.43 foot pounds per inch, a Hunter gloss value of 48.1 and 28.5 percent shrinkage.

Example 4

To a reaction vessel are charged 87.0 parts styrene monomer, 13.0 parts of a butadiene rubber and 5.0 parts of mineral oil. In addition, di-tert-butyl peroxide and tert-dodecyl mercaptan, and tris(nonylphenyl) phosphite are added as catalyst, molecular weight regulator and stabilizers. After the reaction vessel is purged of oxygen by a stream of nitrogen, the reaction mixture is stirred and heated to polymerize approximately 27 percent of the styrene. The resulting syrup has a viscosity in excess of 1000 poises at 25° centigrade at a shear rate of 1.0 second$^{-1}$.

This partially polymerized syrup is then admixed with 105.0 parts of water having dissolved thereon 0.46 part of anhydrous magnesium sulfate, 0.22 part of a condensate of a sodium salt of a naphthalene sulfonic acid sold under the trademark Darvan by R. T. Vanderbilt Company and 0.23 part of the previously mentioned acrylic acidacrylate interpolymer suspending agent. The suspension is agitated and heated to polymerize the styrene monomer while distilling a portion thereof. About 28 parts of styrene monomer is recovered from the distillation together with water.

The impact styrene produced contains about 22 percent of rubber and the average particle size is about 7 to 8 microns.

Example 5

The procedure of Example 4 is repeated with the modification that 33 parts of methyl ethyl ketone (MEK) is added to the reaction mixture. As a result of the stripping step, most of the methyl ethyl ketone is removed in addition to water and a portion of the styrene monomer charged.

The polyblend contains about 20 percent of rubber and has a graft particle size significantly smaller than that produced in Example 4, the average being on the order of about 2.0 microns.

Example 6

The process of Example 1 is substantially repeated, modified in that 70.0 parts of n-hexane is added to the polymerizable mixture and 60.0 parts of rubber is used instead of 51 parts. During the stripping stage, substantially all the n-hexane is removed, in addition to a minor portion of the monomers and water. By this modification, a polyblend having a higher rubber content than that of Example 1 is produced; however, the size of the particles thereof is somewhat larger.

Example 7

A partially polymerized syrup prepared essentially in the manner shown in Example 6 is employed in an amount of 750 parts with 900 parts of water containing the quantity of additives enumerated in Example 2. The suspension which is formed with agitation is heated to and held above 140° centigrade, and a quantity of antifoaming agent is introduced thereinto and stripping is then initiated and continued until the oil phase of the strippings is less than 1.0 percent by volume.

The product which is obtained upon cooling, centifuging, washing and drying contains about 17.5 percent of rubber. Its Izod impact strength is 7.7 foot pounds per inch, and it exhibits a gloss equivalent to 6.0 on the Hunter scale.

Thus, it can be seen from the foregoing specification and specific examples that the present invention provides a novel mass suspension polymerization process for the facile preparation of polyblends having relatively high concentrations of rubber. A high degree of control of the rubber graft particle size may be obtained, and heat transfer and power requirements are maintained within reasonable limits while the need for stripping after polymerization has been completed is substantially obviated.

It is obvious that many variations can be made in the processes set forth without departing from the spirit and scope of this invention.

What is claimed is:
1. In a process for preparing a polyblend composition, the steps comprising
   (a) dissolving a rubbery polymer in a polymerizable formation to form a polymerization mixture, said polymerizable formulation comprising at least two components, said components having the following characteristics:
      (A) at least one component must be a monovinylidene carbocyclic aromatic monomer,
      (B) at least one component must be a polar non-solvent for the rubbery polymer,
      (C) at least one component must be a solvent for the rubbery polymer, said rubbery polymer being present in said polymerizable formulation in an amount of about 8.0 to 20.0% by weight of the monomer component in said polymerizable formulation;
   (b) subjecting said polymerization mixture to polymerization en masse to a point beyond phase inversion to form a partially polymerized mixture wherein the continuous phase is a solution of polymerized monomer in polymerizable formulation and the discontinuous phase is a solution of rubbery polymer in polymerizable formulation;
   (c) forming a suspension system by suspending such partially polymerized mixture in a liquid inert to polymerization reaction;
   (d) subjecting the suspension system to polymerization conditions to produce further polymerization of said polymerizable formulation;
   (e) steam distilling at at least atmospheric pressure from said suspension system a portion of said polymerizable formulation, thereby removing said portion of said polymerizable formulation from said suspension system; and
   (f) continuing the polymerization of the polymerizable formulation in said suspension system to substantially complete polymerization of monomer, yielding a polymerized formulation, containing from 15.0 to 35.0% by weight of rubbery polymer based upon the total weight of the polymeric constituents.

2. The process of claim 1 wherein said polymerizable formulation is essentially free from inert organic diluents, said portion distilled and extracted from said suspension comprising polymerizable monomer in said polymerizable formulation.

3. The process of claim 1 wherein said polymerizable formulation contains an inert organic diluent which is miscible with the polymerizable formulation and a solvent for the polymerized monomer, and wherein said portion of the polymerizable formulation distilled and extracted includes said inert organic diluent.

4. The process of claim 1 wherein the polymerizable formulation contains a polar organic diluent inert to the polymerization reaction.

5. The process of claim 1 wherein the monomer component of the polymerizable formulation consists at least principally of a monovinylidene aromatic hydrocarbon.

6. The process of claim 1 wherein the monomer component of said polymerizable formulation consists at least principally of a monovinylidene aromatic hydrocarbon and an ethylenically unsaturated nitrile.

7. The process of claim 1 wherein the monomer component of said polymerizable formulation consists at least principally of styrene and acrylonitrile.

8. The process of claim 1 wherein said rubbery polymer is selected from the group consisting of diene rubber homopolymers and rubbery interpolymers containing at least 75.0 percent by weight of a conjugated diene.

9. The process of claim 1 wherein said distillation and extraction are conducted simultaneously with continuing polymerization of said suspension.

10. The process of claim 1 wherein the rubbery polymer contains up to 2.0% of a cross-linking agent.

11. The process of claim 1 wherein the distillation is conducted prior to conversion of more than 75.0% of the monomer in the original polymerizable formulation.

12. In the process for preparing a polyblend composition, the steps comprising: dissolving a rubber polymer in a polymerizable monomer formulation containing a monovinylidene aromatic hydrocarbon to form a polymerization mixture, said rubbery polymer being about 8.0 to 20.0 percent by weight of the monomers in said polymerizable formulation; subjecting said polymerization mixture to polymerization en masse to polymerize said monomer formulation past the point of phase inversion to form a partially polymerized mixture wherein the continuous phase is a solution of a monovinylidene aromatic hydrocarbon polymer in monomer formulation and the discontinuous phase is a solution of rubbery polymer in monomer formulation; suspending such partially polymerized mixture in a liquid inert to the polymerization reaction; subjecting the suspension to polymerization conditions to produce further polymerization of said polymerizable formulation while concurrently distilling and extracting from said suspension at at least atmospheric pressure a portion of said polymerizable formulation; and continuing the polymerization of the polymerizable formulation in said suspension to substantial completion, with said rubbery polymer being about 15.0 to 35.0 percent by weight of the polymeric constituents.

13. The process of claim 12 wherein said extracted portion of said polymerizable formulation contains a monovinylidene aromatic hydrocarbon.

14. The process of claim 12 wherein said polymerizable formulation contains an inert organic diluent which is miscible with the monovinylidene aromatic hydrocarbon monomer and a solvent for the monovinylidene aromatic hydrocarbon polymer produced therefrom and wherein said extracted portion is at least principally comprised of said inert organic diluent.

15. The process of claim 12 wherein the polymerizable formulation consists at least principally of styrene and acrylonitrile.

References Cited

UNITED STATES PATENTS

| | | | |
|---|---|---|---|
| 3,144,420 | 8/1964 | Fryling | 260—4 |
| 3,278,642 | 10/1966 | Lee | 260—880 |
| 3,311,675 | 3/1967 | Doak et al. | 260—880 |

FOREIGN PATENTS

| | | |
|---|---|---|
| 924,873 | 5/1963 | Great Britain. |
| 963,307 | 7/1964 | Great Britain. |

MURRAY TILLMAN, Primary Examiner

K. E. KUFFNER, Assistant Examiner

U.S. Cl. X.R.

260—4, 876, 878, 879

| | |
|---|---|
| PO-1050 (5/69) | UNITED STATES PATENT OFFICE |
| | CERTIFICATE OF CORRECTION |

Patent No. 3,488,744     Dated January 6, 1970

Inventor(s) SPEROS P. NEMPHOS & RICHARD E. DELACRETAZ

It is certified that error appears in the above-identified patent and that said Letters Patent are hereby corrected as shown below:

Column 4, line 15 "on" should read --- one ---.

Column 10, line 57 in Example 7, "Example 6" should read --- Example 1 ---.

SIGNED AND
SEALED
AUG 11 1970

(SEAL)
Attest:

Edward M. Fletcher, Jr.
Attesting Officer

WILLIAM E. SCHUYLER, JR.
Commissioner of Patents